Figure 2:
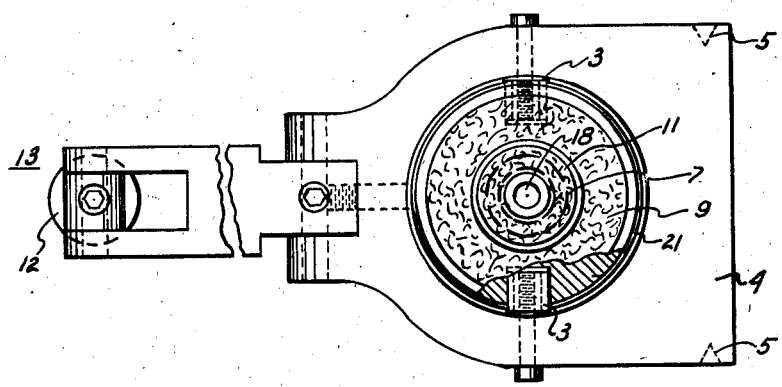

July 16, 1946.   S. C. HURLEY, JR   2,404,233
MECHANISM FOR ROTATING ARTICLES
Filed Sept. 23, 1944   2 Sheets-Sheet 1

INVENTOR.
SAMUEL C. HURLEY, JR.
BY Benedict & Swartwood
ATTORNEYS

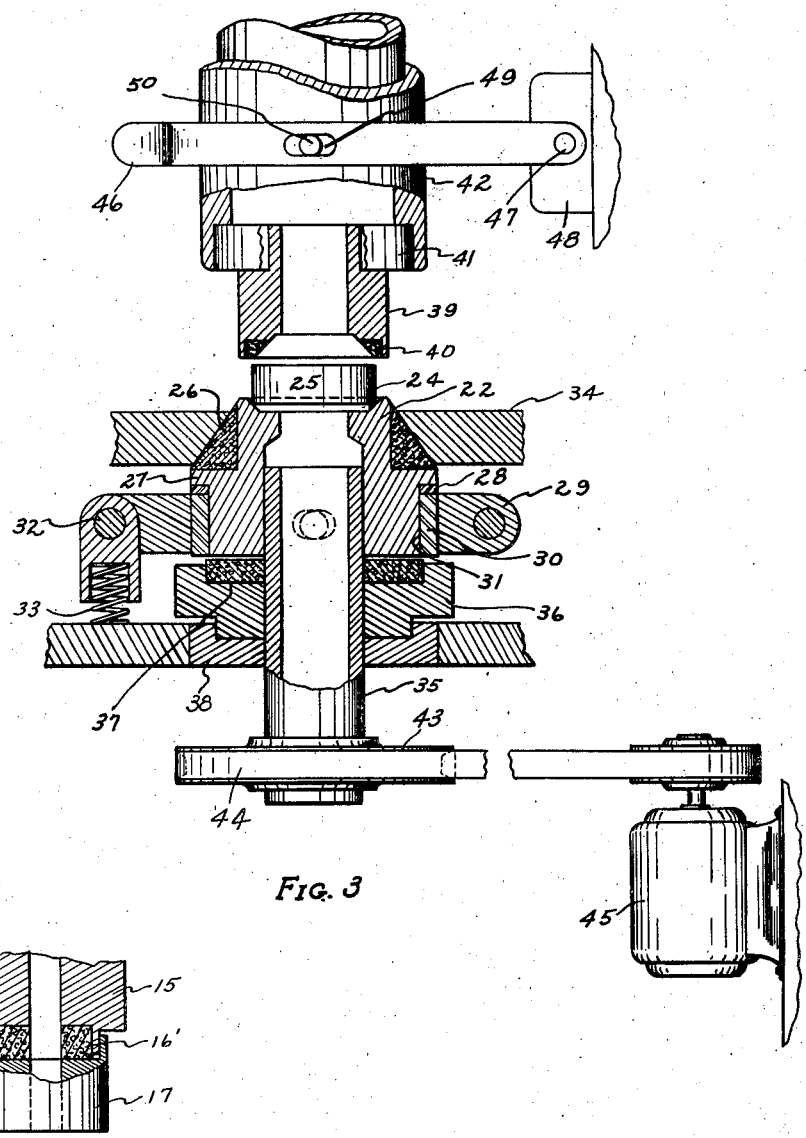

Patented July 16, 1946

2,404,233

UNITED STATES PATENT OFFICE 2,404,233

MECHANISM FOR ROTATING ARTICLES

Samuel C. Hurley, Jr., Danville, Ill.

Application September 23, 1944, Serial No. 555,472

1 Claim. (Cl. 214—1)

This invention relates to an apparatus for rotating unit articles at high speed and under conditions in which the primary rotating means continues in motion, for example, under conditions in which a large number of unit articles must be rotated one after the other in rapid succession in the same apparatus.

More particularly, the invention relates to a device for initiating and stopping the rotation of unit articles, said device being associated with a driving spindle rotating continuously at a constant speed over a long period of time.

During certain types of operations, such as the photoelectric inspection of unit articles, it is necessary to subject such articles to rapid rotation in order to conduct an examination of moving or stationary parts within the articles or to determine the manner in which they will behave when subjected to rotation. Certain types of fuses used in shells and other ammunition, e. g., the fuse mechanism of mortar shells, bombs, etc., must be inspected to determine whether they will function properly under the condition of services; e. g., certain fuse mechanisms must become armed when rotated at a certain number of revolutions per minute, but must not become armed if rotated at somewhat lesser speed. These fuses must be inspected after the detonating charge has been placed in the fuse. The fuse may be rotated at a high speed and then inspected either photoelectrically or by means of a probe introduced through certain apertures in the fuse to determine whether all the parts are present and whether they are functioning properly under the different conditions. Such fuses are produced by the thousands and must be inspected quickly and with the utmost accuracy. To rotate them upon a spindle and to stop the spindle between each inspection would be unduly time consuming, since the speed of rotation of these tests is of the order of two thousand R. P. M. Moreover, the examination must take place at a constant speed which varies only within a few revolutions per minute; therefore, it is impractical to start and stop the primary rotating mechanism between each inspection.

My device offers a method for conducting such inspections while maintaining the driving spindle at a constant speed.

The device may be used in connection with regularly shaped objects, such as cylinders, etc., but is also adaptable to use with articles having an irregular outline; e. g., certain objects may be tapered, or may have one end substantially perpendicular to the sides while the other may be recessed or fitted with protuberances. Likewise, grooves, channels and irregular shaped recesses may be present in certain articles while others may be of a rectangular, oval, elliptical, or other shape. The present apparatus provides means for positioning such articles quickly and accurately without delays which might be occasioned if it were necessary to place the object in a holder shaped to accommodate the articles. With this device, one article after another in rapid succession can be fed into the inspection zone, subjected to the rotation and inspection or to the operations which are to be performed and then ejected at high rates of speed.

Figure 1:
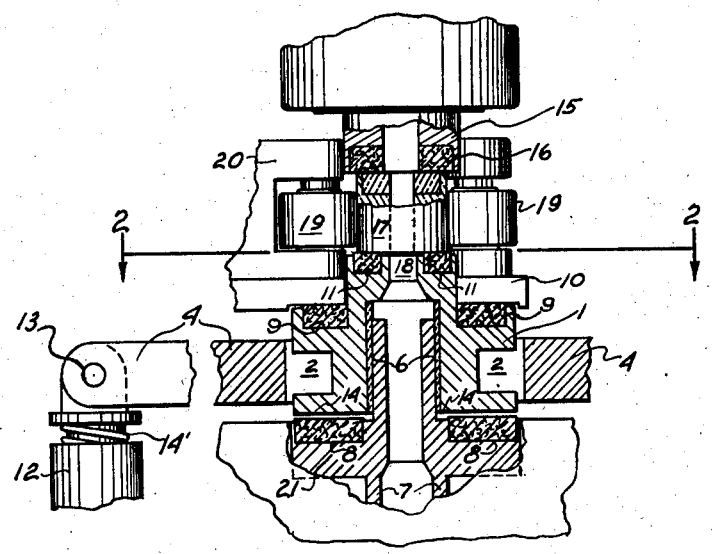

Figure 1 is a side view partly in section of one embodiment of this apparatus. Figure 2 is a top view along line 2—2 of the apparatus shown in Figure 1, eliminating plate 10 and yoke 20. Figure 3 is a side view in section of another modification of the device. Figure 4 is a side view of a modified nose piece associated with an article to be rotated.

Broadly speaking, the apparatus comprises a nose piece containing resilient friction means for holding an article in position, a rotatable clutch comprising a resilient friction means oppositely positioned from the nose piece, also, for holding the article in position; bearing means to permit the clutch mechanism to rotate; a brake plate; resilient brake means positioned on the clutch adjacent to the brake plate; a rotatable spindle having a resilient friction lining associated therewith adjacent the rotatable clutch; means for introducing an article to be rotated in axial alignment with the nose piece, clutch and spindle; means for engaging the nose piece with the article and simultaneously thrusting the rotatable clutch into engagement with the friction lining on the rotatable spindle thereby to rotate the clutch, article and nose piece, and means for periodically lifting the clutch mechanism out of engagement with the lining on the spindle and into engagement with the brake plate to stop the rotation of the object without stopping the spindle.

Refer now to Figure 1. The rotatable clutch 1 may comprise a single casting or forging which has been machined to the limit of tolerance. The main body of the clutch contains a channel 2 which serves as a bearing surface for a pair of idler needle bearings 3, (see Figure 2) which are supported in yoke 4. These needle bearings serve the dual purpose of bearings while the clutch is being rotated and as means for raising the clutch into contact with the brake and lowering it into contact with the spindle when the yoke 4 raised and lowered. The yoke 4 may be hinged on pivots 5.

Sleeve bearing 6 may be provided in the annular space through the center of the rotatable clutch 1. The spindle 7 is a hollow shaft positioned on the axis of the clutch 1 and extends into the annular space within the clutch. The spindle bears on bearing 6 as it rotates and guides the clutch in its vertical movement. A circular rotating table 21 extending at right angles to the axis of rotation of spindle 7 and integral therewith, contains friction lining 8. This extends slightly above the surface of the table so that an object pressed vertically upon the table will strike the clutch lining before it contacts the metal part of the table. It is possible to put the resilient friction lining on the clutch itself rather than the spindle.

A circular channel is provided in the clutch 1, in which lining 9 is placed. This is adjacent a fixed brake plate 10 in such a position that the lining 9 will press against plate 10 when the yoke 4 is thrust upward by the action of spring 14'. As in the case of lining 8, the lining 9 extends above the metal edges of the channel so that the clutch will contact brake plate 10 and create sufficient friction to stop the clutch from rotating. The distance between brake plate 10 and the rotating table 21 is sufficiently great to provide clearance between one of these members and the rotatable clutch when it is pressed against the other member.

Another channel is positioned in the upper flat surface of the rotating clutch and is equipped with lining 11. This lining also extends above the metal forming the channel; it is designed to engage with the article to be rotated when it is in position.

During operation, the spindle 7 is rotated at a constant speed. The yoke 4 is designed to be moved up or down so as to thrust the rotatable clutch 1 against the brake plate or the lining 8 on the spindle table respectively. This movement of the yoke, and consequently, of the clutch, may be accomplished in any known manner, but is preferably carried out pneumatically by means of air cylinder 12, attached to the yoke 4 by pivot means 13. The yoke can be moved up and down at regular intervals by means of an automatic valve system or suitable cams. The apparatus, as shown, is equipped with a spring 14', associated with the air cylinder so as to normally thrust yoke 4 upward with the friction lining 9 in contact with brake plate 10 so that the clutch does not revolve. At intervals air may be injected into the air cylinder so as to thrust yoke 4 in a downward direction, thereby causing butt plate 14 of clutch 1 to engage with lining 8. With proper synchronization with the mechanism raising and lowering the nose piece, a regular and rapid operation can be obtained wherein the clutch mechanism is alternately rotated at high speed and is stopped.

A nose piece 15, having associated therewith a friction lining 16, is placed above the clutch 1 in such a position that it can be thrust downward for a distance sufficient to engage an article 17 when it is positioned within the inspection zone. The pieces may be introduced into this zone by means of an automatic ram or positioner which thrusts the piece into the inspection zone synchronous with the vertical movements of yoke 4 and of nose piece 15. The nose piece may be raised and lowered by a cam or air cylinder or other suitable device. The shape of the nose piece and the lining 16 may vary considerably depending upon the shape of the article to be rotated. Figure 4 shows a modification in which the nose piece fits into a recess in article 17, thus aiding in centering the article as well as to hold it while it is rotated. In this case, the nose piece 15 may or may not be lined, but is shown with a lining 16'. The article 17 shown in position for rotation is, in this case, in the form of a right cylinder having an annular recess at its upper end. Lining 16 when thrust against the article 17 will tend to conform to it and hold it firmly against lining 11. Both article 17 and clutch 1 rotate at a speed identical with that of the spindle when the latter is thrust downward against lining 8.

As illustrated, the device may be used for conducting an inspection by casting a light through the hollow shaft of spindle 7 and through the opening 18 in the rotatable clutch thence, through an aperture in article 17 and through the hollow shaft of driving nose 15 to a suitable optical and photoelectric system located above this part of the machine. In another form, a pin or probe may be thrust through the hollow shaft into the article under examination to determine the presence and position of an opening therein.

Although it is not essential to the broad embodiment of my invention, idler rollers 19 may be provided within a suitable yoke 20. These may be three or more in number and serve to guide the article 17 into position. A third roller (not shown) may be positioned directly in front of the article as illustrated in Figure 1.

Figure 3 illustrates another embodiment of my invention. A rotatable clutch is generally indicated as 22. The body may comprise a single casting, although this is not essential. An annular opening 23 extends through the clutch and may be fitted through part of its length with a replaceable sleeve bearing (not shown). The top of the clutch may comprise a tapered recess 24 which is shown without a lining; however, it is within the scope of the invention that a resilient lining should be used. This recess is intended to receive the lower part of the article 25 to be rotated. Adjacent the rim of recess 24, the body of the clutch is cut away circumferentially in a manner indicated to form a recess substantially triangular in shape when viewed in cross-section, to receive friction lining 26 which may be of resilient material. The lower portion of the cutout forms a shoulder 27 against the lower part of which a hardened replaceable ring 28 is pressed. Ring 28 rotates with the clutch. This ring may, in some cases, be dispensed with. However, it is preferably used since it is subjected to a certain amount of wear and it can easily be replaced as necessary.

Around the clutch is pivoted yoke 29, fitted with a fixed ring 30 which also may be of a hardened material. This ring serves as a guide for the body of clutch 22, forming a bearing surface at 31. Clearance is sufficient to permit the pivoted yoke 29 to be moved up and down freely. Yoke 29 may be fitted with a pivoting device 32 and spring 33 which normally tends to push the clutch 22 out of engagement with friction lining 31, against brake plate 34, thereby preventing its rotation. Ring 30 bears upon ring 28 when the yoke is in the upward position, thrusting the lining 26 against the surface of brake plate 34 which is tapered to conform to the shape of lining 26.

A spindle 35 extends upward into the annular space 23 and forms a non-driving bearing surface therein. It also serves to guide the clutch 22 in its vertical motion. A rotating table 36, containing lining 37, is removably attached to a plate 38 which, in turn, is attached to spindle 35. This affords a rapid and ready means for replacing the friction lining as it becomes worn. Spindle 35 is rotated by any suitable power means and is equipped with suitable bearings (not shown). A spindle 35 has a pulley 43 attached thereto and by means of the pulley belt 44 the spindle may be rotated by the motor 45. Alternatively, but not equivalently, the friction lining 37 may be incorporated in a channel in clutch 22, and the surface of spindle table 36 may be flat. Also, a butt plate may be removably attached to the lower portion of clutch 22, although as a rule, this is not needed.

As in the case of the apparatus shown in Figures 1 and 2, the yoke 29 may be raised and lowered by means of a cam or air cylinder, etc. In this case, its movement may be synchronized with those of the nose piece.

Above the clutch and axially aligned therewith is a nose piece 39 which may contain a lining 40. The nose piece is rotatable and rides on bearings 41 in a shaft 42 which may be raised and lowered hereinafter described, so as to thrust the nose piece 39 against the article 25, and being of sufficient strength to push the clutch 22 against lining 37 of the rotating spindle, thereby causing clutch 22, article 25 and nose piece 39 to rotate at the same speed and in the same direction as spindle 35. The shaft 42 may be raised and lowered for the purposes as above set forth by means of the lever 46 which is pivoted at point 47 in support 48. The lever 46 has a slot 49 which engages a pin 50, the pin 50 being fixedly attached to the shaft 42. The hand lever 46 enables the operator to thrust the nose piece 39 against the article 25. When the nose piece 39 is raised, by means of air cylinders or cams, etc. the spring 33 causes clutch 22 to disengage from lining 37 and thrusts lining 26 against brake plate 34, thereby stopping the rotation of the clutch and article 25. The clearance between nose piece 39 and clutch 22 is sufficient to permit articles to be thrust into position and removed after inspection.

Spindle 35, clutch 22, nose piece 39 and the shaft supporting the nose piece, are hollow to permit light to be passed therethrough or may be equipped to permit a probe to be inserted into article 25, when the apparatus is used for inspection purposes. For other uses not requiring an opening to the interior of article 25, the parts may be solid if desired.

According to another embodiment, the nose piece of the device may be equipped with a projection which extends into the article and against a surface therein so as to grip it firmly. The type of nose piece and guide rolls illustrated in Figures 1 and 4 may also be used with this modification of rotating mechanism. The device may be used to conduct inspections or other operations while the article is in motion or the article may be rotated in order to effect a predetermined operation thereon, then the mechanism stopped and the examination or another operation may be carried out on the stationary object.

The article may be ejected by raising the nose piece 15 after the rotating clutch has been stopped in the manner described. Ordinarily, the object is pushed out of position by the next incoming article to be examined. It may then be routed to an appropriate destination by actuation of a suitable mechanism (not shown).

Although I have described various embodiments, it should be understood that I am not limited to the exact apparatus or uses illustrated. The apparatus may be used, for example, in conjunction with grinding, polishing, etc., operations.

I claim as my invention:

Mechanism for rotating articles comprising a nose piece containing resilient friction means for holding an article in position, said nosepiece being rotatable by the rotation of the article being rotated, a rotatable clutch comprising a resilient friction means oppositely positioned from the nosepiece for also holding the article in position, bearing means to permit the clutch to rotate, a brake plate, resilient brake means positioned on the clutch adjacent to the brake plate, a rotatable spindle having a resilient friction lining associated therewith adjacent the clutch and for engaging the clutch to rotate it, driving means for rotating the spindle, clutch and spindle, means for engaging the nosepiece with the article and simultaneously thrusting the rotatable clutch into engagement with the friction lining on the rotatable spindle thereby to rotate the clutch, and means for periodically lifting the clutch mechanism out of engagement with the lining on the spindle and into engagement with the brake plate to stop the rotation of the article without stopping the spindle.

SAMUEL C. HURLEY, Jr.